(12) United States Patent
Sankaranarayanan et al.

(10) Patent No.: US 10,229,018 B2
(45) Date of Patent: Mar. 12, 2019

(54) SYSTEM AND METHOD FOR DATA RESTORE FLEXIBILITY ON DUAL CHANNEL NVDIMMS

(71) Applicant: DELL PRODUCTS, LP, Round Rock, TX (US)

(72) Inventors: Vadhiraj Sankaranarayanan, Austin, TX (US); Bhyrav M. Mutnury, Round Rock, TX (US); Stuart Allen Berke, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 182 days.

(21) Appl. No.: 15/443,530

(22) Filed: Feb. 27, 2017

(65) Prior Publication Data

US 2018/0246790 A1    Aug. 30, 2018

(51) Int. Cl.
| | | |
|---|---|---|
| *G06F 11/00* | (2006.01) | |
| *G06F 11/20* | (2006.01) | |
| *G06F 3/06* | (2006.01) | |

(52) U.S. Cl.
CPC .......... *G06F 11/201* (2013.01); *G06F 3/0619* (2013.01); *G06F 3/0635* (2013.01); *G06F 3/0655* (2013.01); *G06F 3/0679* (2013.01); *G06F 11/2017* (2013.01)

(58) Field of Classification Search
CPC .................................................. G06F 11/201
See application file for complete search history.

(56) References Cited

U.S. PATENT DOCUMENTS

| | | | | |
|---|---|---|---|---|
| 5,313,624 | A | * | 5/1994 | Harriman ............ G06F 11/1044 714/6.2 |
| 6,819,577 | B1 | | 11/2004 | Wiktor et al. |
| 7,368,959 | B1 | | 5/2008 | Xu et al. |
| 8,275,945 | B2 | * | 9/2012 | Tzeng ................. G06F 12/0246 710/52 |
| 8,489,775 | B2 | | 7/2013 | Berke et al. |

(Continued)

OTHER PUBLICATIONS

U.S. Appl. No. 15/331,064, filed Oct. 21, 2016.
(Continued)

*Primary Examiner* — Christopher S McCarthy
(74) *Attorney, Agent, or Firm* — Larson Newman, LLP

(57) ABSTRACT

A DIMM includes first and second DRAM devices, each configured to perform memory transactions for memory locations associated with the DRAM device via a respective first and second memory channel. The DIMM also includes a non-volatile memory device and a DIMM controller. The DIMM controller stores data from the first and second memory locations to the non-volatile memory device in response to a save data operation, receives an indication that communication via the first memory channel has failed, stores the first data from the non-volatile memory device to the second DRAM device in response to the indication and a restore data operation, provides an indication that the data is stored on the second DRAM device, receives an indication that the data has been read, stores the second data from the non-volatile memory device to the second DRAM device, and provides an indication that the second data is stored on the second DRAM device.

20 Claims, 5 Drawing Sheets

(56) References Cited

U.S. PATENT DOCUMENTS

| | | | |
|---|---|---|---|
| 2009/0327596 A1* | 12/2009 | Christenson | G06F 13/1684 |
| | | | 711/105 |
| 2011/0051677 A1* | 3/2011 | Jetcheva | H04W 72/0486 |
| | | | 370/329 |
| 2012/0023262 A1 | 1/2012 | Berke et al. | |
| 2016/0118121 A1 | 4/2016 | Kelly et al. | |
| 2017/0199830 A1* | 7/2017 | Nale | G06F 13/1673 |
| 2017/0293343 A1* | 10/2017 | Chinnakkonda Vidyapoornachary | G06F 1/3225 |
| 2018/0246647 A1* | 8/2018 | Sankaranarayanan | G06F 3/065 |
| 2018/0293012 A1* | 10/2018 | Khatri | G06F 3/0629 |

OTHER PUBLICATIONS

U.S. Appl. No. 15/276,240, filed Sep. 21, 2016.
XED: Exposing On-Die Error Detection Information for Strong Memory Reliability, Prashant J. Nair et al., ISCA-43, Jun. 20, 2016, pp. 1-13.

\* cited by examiner

SYSTEM AND METHOD FOR DATA RESTORE FLEXIBILITY ON DUAL CHANNEL NVDIMMS

FIELD OF THE DISCLOSURE

This disclosure generally relates to information handling systems, and more particularly relates to data restore flexibility on dual channel NVDIMMs.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

Memory for an information handling system often includes one or more Dual In-Line Memory Modules (DIMMs). The DIMMs are typically configured in accordance with a particular Double Data Rate (DDR) standard, such as a fourth generation standard (DDR4). A new DDR standard, the fifth generation standard (DDR5) is configured such that the memory devices on a DDR5 DIMM are accessed and controlled via two separate and independent memory channels. If one of the two channels fails, data stored on the failed channel becomes inaccessible to the information handling system and can lead to a crash. Some Non-Volatile DIMMs (NVDIMMs), such as JEDEC standard NVDIMM-N type NVDIMMs, include a combination of Dynamic Random Access Memory (DRAM) devices and non-volatile memory devices, such as Flash or other suitable non-volatile memory devices.

A NVDIMM may include first and second DRAM devices. Each DRAM device may be configured to perform memory transactions for memory locations associated with the DRAM device via a respective first and second memory channel. The NVDIMM also may include a non-volatile memory device and a DIMM controller. The NVDIMM controller may store data from the first and second memory locations to the non-volatile memory device in response to a save data operation, receive an indication that communication via the first memory channel has failed, store the first data from the non-volatile memory device to the second DRAM device in response to the indication and a restore data operation, provide an indication that the data is stored on the second DRAM device, receive an indication that the data has been read, store the second data from the non-volatile memory device to the second DRAM device, and provide an indication that the second data is stored on the second DRAM device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
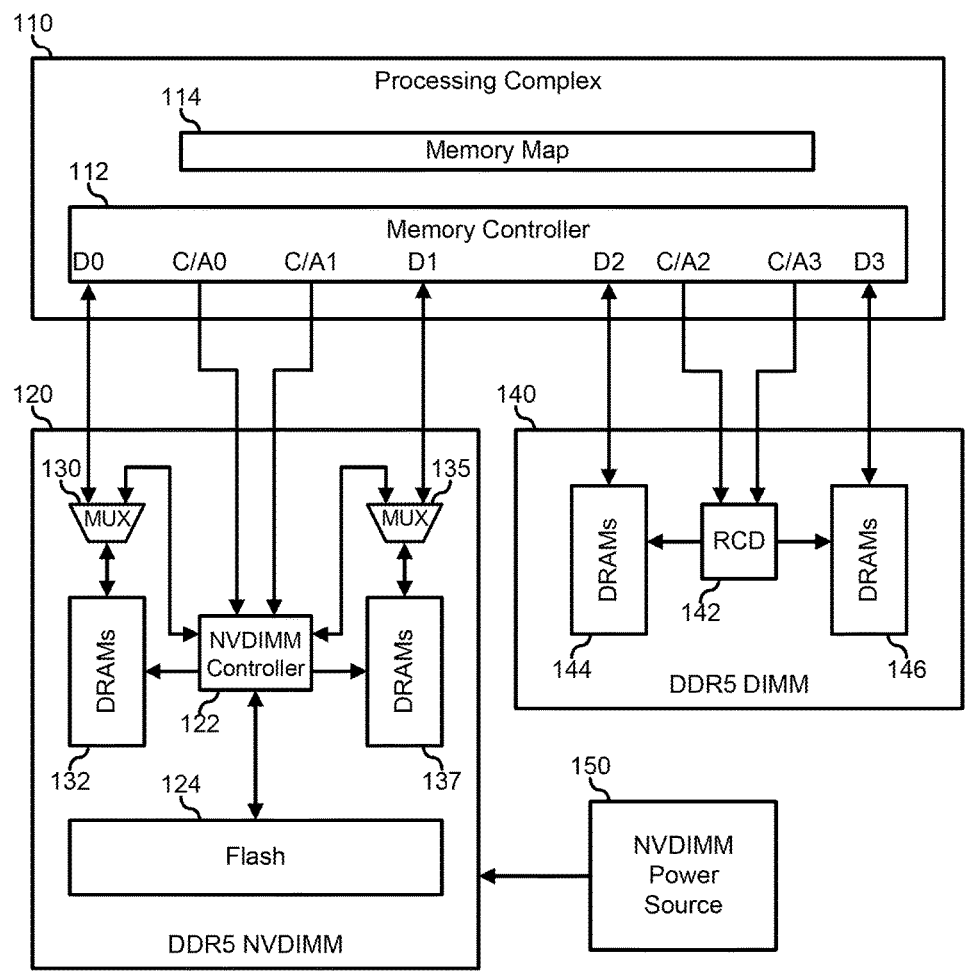
FIG. 1 is a block diagram illustrating an information handling system that has a four-channel DDR5 architecture, and that includes DDR5 NVDIMMs according to an embodiment of the present disclosure.

FIG. 1 illustrates an embodiment of an information handling system 100. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system can 100 also include one or more buses operable to transmit information between the various hardware components.

Information handling system 100 includes a processing complex 110, a fifth generation Dual Data Rate (DDR5) Non-Volatile Dual In-Line Memory Module (NVDIMM) 120, a DDR5 DIMM 140, and a NVDIMM power source 150. Information handling system 100 is implemented as a four-channel DDR5 architecture. DDR5 NVDIMM 120 represents a JEDEC standard NVDIMM-N type NVDIMM that includes memory mapped Dynamic Random Access Memory (DRAM) devices of the DDR5 NVDIMM that provide the for data storage under normal operating conditions for information handling system 100. Under certain operating conditions, such as in the event of a loss of system power, the data stored in the DRAM devices is saved to flash memory devices of DDR5 NVDIMM 120. Later, such as when the system power is restored, the data stored in the flash memory devices is restored to the DRAMs. Typically, the data stored in the DRAM devices is saved and restored such that the data stored in the DRAM devices associated with a particular memory channel is restored to the DRAM devices from which the data was saved. However, DDR5 NVDIMM 120 also provides a flexible data restore operation where the data stored from the DRAM devices associated with a first memory channel is restored to the DRAM devices associated with the second memory channel. The flexible data restore operation may be utilized in various failure scenarios, such as the event of a memory channel failure, or the failure of one of the DRAM devices associated with the memory channel. In this way, if a failure occurs after a Save operation, but before the subsequent Restore operation, the data associated with failed memory channel is not permanently lost, but is provided to information handling system 100 via the other memory channel. For example in the flexible data restore operation, the data associated with the failure can first be restored to the DRAM devices associated with the non-failing memory channel and information handling system 100 can read the data from the DRAM via the non-failing memory channel and remap the data to a new memory location. Then the data associated with non-failing memory channel can be restored to the DRAM devices associated with the non-failing memory channel, and information handling system 100 can access the data via the non-failing memory channel.

Processing complex 110 includes a hardware memory controller 112 and a memory map 114. Processing complex 110 represents the hardware, software, firmware, and other elements associated with the performance of the processing tasks associated with information handling system. As such, processing complex 110 may be understood to include one or more data processors or processing cores, one or more input/output (I/O) devices such as processor, memory, or I/O controller hub, system memory including random access memory (RAM) and system read-only memory (ROM), mass data storage devices, video processors, network interface devices, or other devices typical to an information handling system, as needed or desired. Memory controller 112 represents a device of processing complex 110 that manages the flow of data going to and from DDR5 NVDIMM 120 and DDR5 DIMM 140. Memory controller 112 is configured to implement a four-channel DDR5 architecture. As such, memory controller 112 is connected to DDR5 NVDIMM 120 via two DDR5 channels (channels 0 and 1), and is connected to DDR5 DIMM 140 via two additional DDR5 channels (channels 2 and 3). Each channel includes a data bus (D#) and a control/address bus (C/A#). Memory map 114 is utilized by information handling system 100 in remapping data from memory locations associated with a DDR5 channel failure to new memory locations, as described further, below.

DDR5 NVDIMM 120 includes two separate channels for communicating with memory controller 112, and includes a NVDIMM controller 122, a flash device 124, a first memory channel multiplexor 130, first channel DRAM devices 132, a second channel multiplexor 135, and second channel DRAM devices 137. NVDIMM controller 122 is connected to command/address bus C/A0 and to command/address bus C/A1 to receive command and address information from memory controller 112 for DDR5 channel 0 and DDR5 channel 1, respectively. NVDIMM controller 122 is also connected to DRAM devices 132 and DRAM devices 137 to provide the command and address information to the DRAM devices. DRAM devices 132 are connected to multiplexor 130 to selectively connect to data bus D0 to transfer data between the DRAM devices and memory controller 112, and to NVDIMM controller 122 to transfer data between the DRAM devices and flash device 124. Similarly DRAM devices 137 are connected to multiplexor 135 to selectively connect to data bus D1 to transfer data between the DRAM devices and memory controller 112, and to NVDIMM controller 122 to transfer data between the DRAM devices and flash device 124. Multiplexors 130 and 135 may be implemented as discrete components, within the Data Buffer devices on Load-Reduced DIMMs (LRDIMMs), within DRAM devices 132 and 137, or in any other suitable device that meets the data steering and signal integrity requirements. In all cases the Multiplexor function supports all required dataflow paths including directional or bi-directional steering of the data as needed for normal operation, during Save data operations, and during Restore data operations, and flexible Restore data operations as needed for channel failure recovery scenarios.

DDR5 DIMM 140 includes two separate channels for communicating with memory controller 112. An example of DDR5 DIMM 120 includes an unbuffered DIMM (UDIMM), a registered DIMM (RDIMM), a load reduced DIMM (LRDIMM), a storage class memory (SCM), or another type of fifth generation DIMM. DDR5 DIMM 140 includes a Register Control Device (RCD) 142, and DRAM devices 144 and 146. DDR5 DIMM 140 is illustrated herein as including RCD 142, and the functions and features of operation of the DDR5 DIMM are illustrated and described within the context of a RDIMM, but this is not necessarily so, and the skilled artisan will understand that the functions and features of operation of a DDR5 DIMM as described herein may be provided in other ways, such as by a Programmable Logic Device (PLD), as needed or desired by the particular design of the DDR5 DIMM. RCD 142 is connected to command/address bus C/A2 and to command/address bus C/A3 to receive command and address information from memory controller 112 for DDR5 channel 2 and DDR5 channel 3, respectively. RCD 142 is also connected to DRAM devices 144 and DRAM devices 146 to provide the command and address information to the DRAM devices. DRAM devices 144 is connected to data bus D2 to transfer data between DRAM devices 144 and memory controller 112, and DRAM devices 146 is connected to data bus D3 to transfer data between DRAM devices 146 and the memory controller.

In normal operation, memory transactions for memory locations associated with DRAM devices 132 are conducted on DDR5 channel 0, memory transactions for memory locations associated with DRAM devices 137 are conducted on DDR5 channel 1, memory transactions for memory locations associated with DRAM devices 144 are conducted on DDR5 channel 2, and memory transactions for memory locations associated with DRAM devices 146 are conducted on DDR5 channel 3. For example, a memory read to a memory location associated with DRAM devices 137 will start with memory controller 112 presenting command and address information on C/A1. NVDIMM controller 122 will provide the command and address information to DRAM devices 137 and set multiplexor 135 to permit data transfers between memory controller 112 and the DRAM devices, and the DRAM devices will provide the read data from the addressed memory location to memory controller 112 on data bus D1. In another example, a memory write to a memory location associated with DRAM devices 144 will start with memory controller 112 presenting command and address information on C/A2 and the write data on data bus D2. RCD 142 will provide the command and address information to DRAM devices 144 and the DRAM devices will read the data from D2 and store the data to the addressed memory location.

Information handling system 100 operates to provide for a save data operation to be performed for the data stored on DDR5 NVDIMM 120. Here, an event, such as a loss of system power, can trigger the save data operation. The save data operation can include steps by processing complex 110, such as the flushing of all processor caches to DDR5 NVDIMM 120. After processing complex 110 is finished with memory transactions, memory controller 112 initiates an Asynchronous DRAM Refresh (ADR) mode on DDR5 NVDIMM 120, and the DDR5 NVDIMM proceeds to save the data from DRAM devices 132 and DRAM devices 137 to flash device 124. In the ADR mode, multiplexor 130 is set to connect DRAM devices 132 to NVDIMM controller 122 and multiplexor 135 is set to connect DRAM devices 137 to the NVDIMM controller. In this way, DRAM devices 132 and DRAM devices 137 are isolated from memory controller 112. NVDIMM controller 122 then reads the data from DRAM devices 132 and DRAM devices 137, and stores the data to flash device 124. In the ADR mode, DDR5 NVDIMM 120 receives power from NVDIMM power source 150 to perform the data reads from DRAM devices 132 and DRAM devices 137, and to store the data to flash device 124. In a particular embodiment, NVDIMM power source 150 represents a battery device that is dedicated to DDR5 NVDIMM 120 and any other NVDIMM devices of information handling system 100, as needed or desired, in order to conduct the save data operation on the information handling system. In another embodiment, NVDIMM power source 150 represents one or more super-capacitors that are configured to provide power to DDR5 NVDIMM 120 and any other NVDIMM devices of information handling system 100, as needed or desired, in order to conduct the save data operation on the information handling system.

Following a save data operation, for example, when system power is restored, information handling system 100 performs a system reboot. As part of the system reboot, information handling system 100 performs memory initialization operations that include a memory restore operation to restore any data stored in a flash device of a NVDIMM-N back to the associated DRAM devices of the NVDIMM-N. In particular, DDR5 NVDIMM 120 will be directed by information handling system 100 to restore data saved in flash device 124 back to DRAM devices 132 and DRAM devices 137. In a normal memory restore operation, multiplexor 130 is set to connect DRAM devices 132 to NVDIMM controller 122 and multiplexor 135 is set to connect DRAM devices 137 to the NVDIMM controller. In this way, DRAM devices 132 and DRAM devices 137 are isolated from memory controller 112. NVDIMM controller 122 then reads the data that was stored from DRAM devices 132 and stores the data to DRAM devices 132, and reads the data that was stored from DRAM devices 137 and stores the data to DRAM devices 137. That is, in a normal memory restore operation, the data is restored to the same memory channel that the data was saved from.

Note that, as illustrated, DRAM devices 132 are isolated from memory controller 112 by selecting to connect DRAM devices 132 to NVDIMM controller 122 via multiplexor 130, and that DRAM devices 137 are isolated from the memory controller by selecting to connect DRAM devices 137 to the NVDIMM controller via multiplexor 135, but this is not necessarily so. In another embodiment, DRAM devices similar to DRAM devices 132 and 137 represent dual-port devices. Here, a DDR5 NVDIMM similar to DDR5 NVDIMM 120 does not include multiplexors similar to multiplexors 130 and 135. Instead, for each DRAM device, a first port of the DRAM device is directly connected to a memory controller similar to memory controller 112, and a second port of the DRAM device is directly connected to a NVDIMM controller similar to NVDIMM controller 122. Here, when the DRAM devices are to be isolated from the memory controller, the DDR5 NVDIMM is configured such that the DRAM devices ignore activity on their respective first ports, thereby effectively isolating the DRAM devices from the memory controller. Other memory configurations may be utilized in providing DRAM devices and flash memory devices, as needed or desired. In particular, although flash memory device 124 is shown as a single device, this is not necessarily so, and an individual flash memory device can be provided for each bank of DRAM devices.

Figure 2:
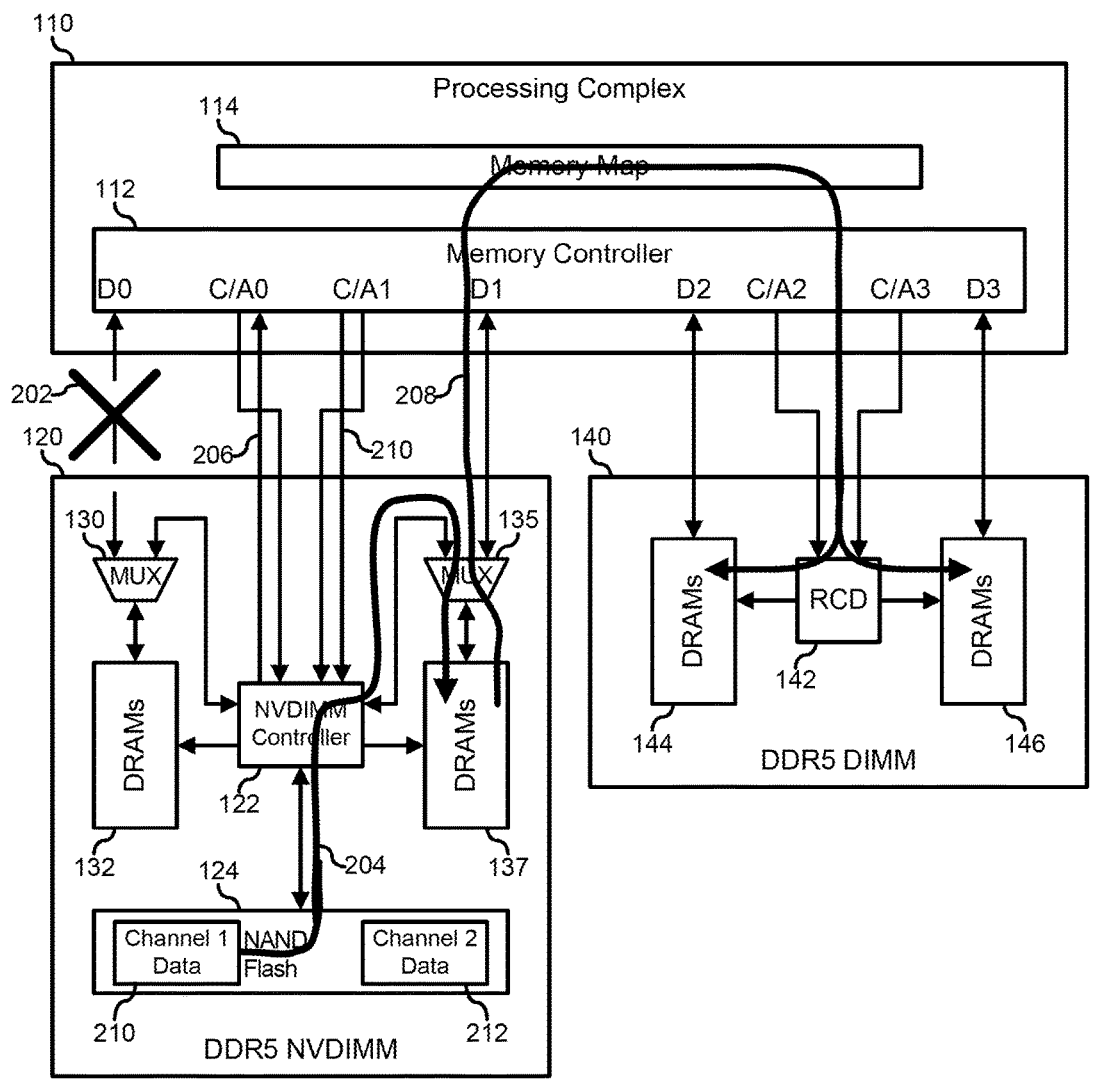
FIGS. 2 and 3 illustrate a method for data restore flexibility on dual channel NVDIMMs on the information handling system of FIG. 1.
Figure 3:
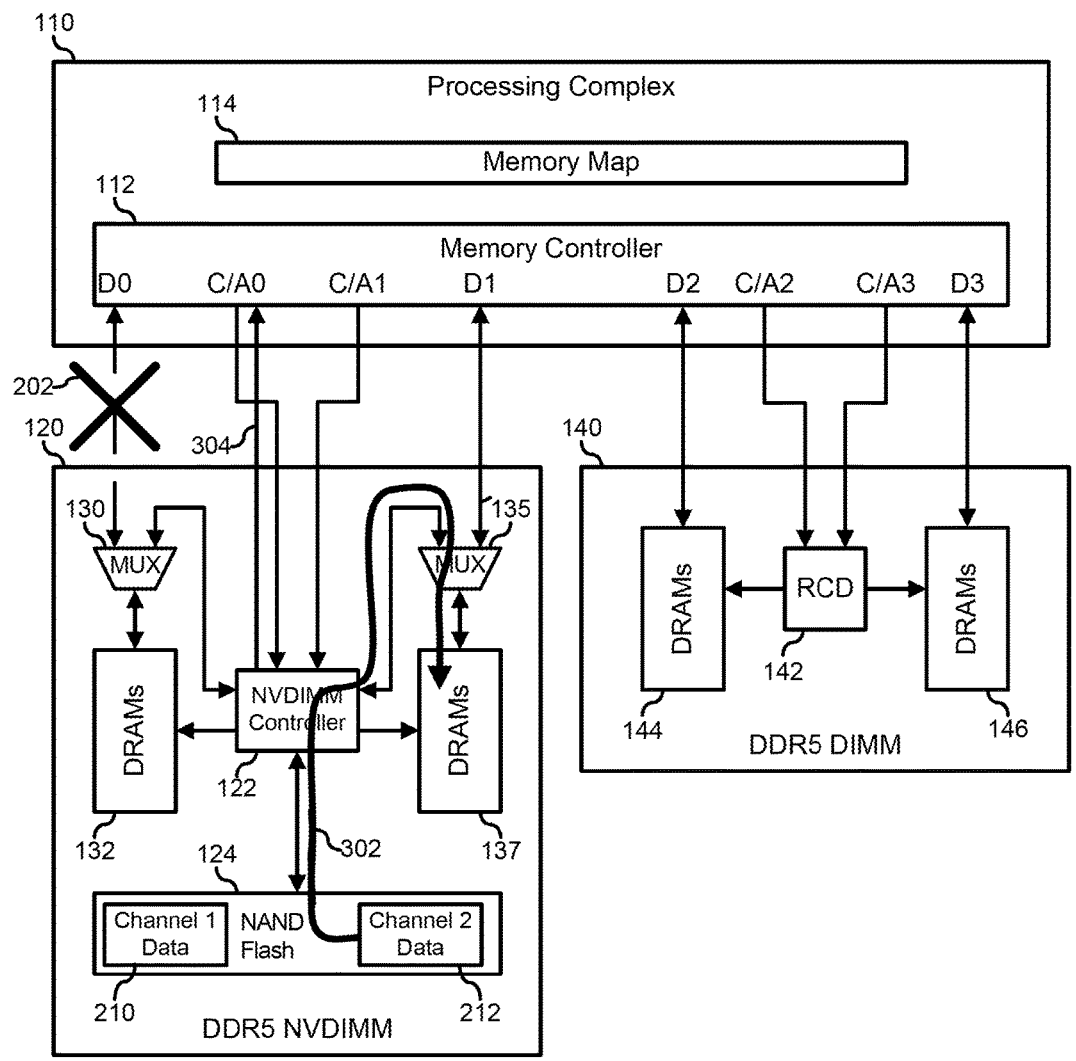

FIGS. 2 and 3 illustrate a method of utilizing information handling system 100 in the event of a DDR5 channel failure. In the illustrated example, beginning in FIG. 2, data bus D0 is experiencing a failure 202 on DDR5 channel D0 such that data can no longer be reliably transmitted between memory controller 114 and DRAMs 124. In a particular embodiment, failure 202 on DDR5 channel D0 is detected by memory controller 114. In another embodiment, failure 202 on DDR5 channel D0 is detected by DDR5 NVDIMM 120, such as where NVDIMM controller 122 or DRAMs 132 detects the DDR5 channel failure, and the DDR5 DIMM provides information to memory controller 112 indicating that DDR channel D0 has experienced failure 202 on DDR5 channel D0. An example of failure 202 on DDR5 channel D0 includes a complete loss of signal on one or more data lane of data bus D0, a degradation in performance on one or more data lane of data bus D0, such as an increase in a Bit-Error Rate (BER) for the one or more data lanes, a failure of one or more of DRAMs 132, or other failure modes as are known in the art.

When either memory controller 112 or DDR5 NVDIMM 120 detects failure 202 on DDR5 channel D0, the DDR5 NVDIMM initiates the flexible data restore operation. Here, in a first phase of the flexible data restore operation, NVDIMM controller 122 sets multiplexor 135 to connect DRAM devices 137 to NVDIMM controller 122 to isolate the DRAM devices from memory controller 112. Next, NVDIMM controller 122 reads data 210, the data that is associated with DRAM devices 132 and DDR5 channel 0, and stores the data to DRAM devices 137 in a first step 202. NVDIMM controller 122 then sets multiplexor 135 to connect DRAM devices 137 to memory controller 112, and provides an indication 206 to memory controller 112 that data 210 is restored to DRAM devices 137. Indication 206 may be provided by a back-channel communication path, such as by setting a bit in a register that is polled by memory controller 112, such as on a Serial Presence Detect (SPD) device on DDR5 NVDIMM 120, or the indication may be provided on a back-channel path of command and address bus C/A0 or on command and address bus C/A1, as needed or desired. When memory controller 112 receives indication 206, the memory controller reads 208 the data and writes the data to a free memory location on DRAM devices 144, on DRAM devices 146, or to other free memory locations, and the memory controller remaps the memory locations on DDR5 channel D0 that were associated with data 210 to the new memory locations in memory map 114. Memory controller 112 then provides an indication 210 to NVDIMM controller 122 that the reading and remapping of data 210 is complete, thus completing the first phase of the flexible data restore operation.

FIG. 3 continues with a second phase of the flexible data restore operation on information handling system 100. NVDIMM controller 122 sets multiplexor 135 to connect DRAM devices 137 to NVDIMM controller 122 to isolate the DRAM devices from memory controller 112. Next, NVDIMM controller 122 reads data 212, the data that is associated with DRAM devices 137 and DDR5 channel 1, and stores the data to DRAM devices 137 in a first step 302. NVDIMM controller 122 then sets multiplexor 135 to connect DRAM devices 137 to memory controller 112, and provides an indication 304 to memory controller 112 that data 212 is restored to DRAM devices 137. Indication 304 may represent a normal indication that an NVDIMM restore operation is completed.

Figure 4:
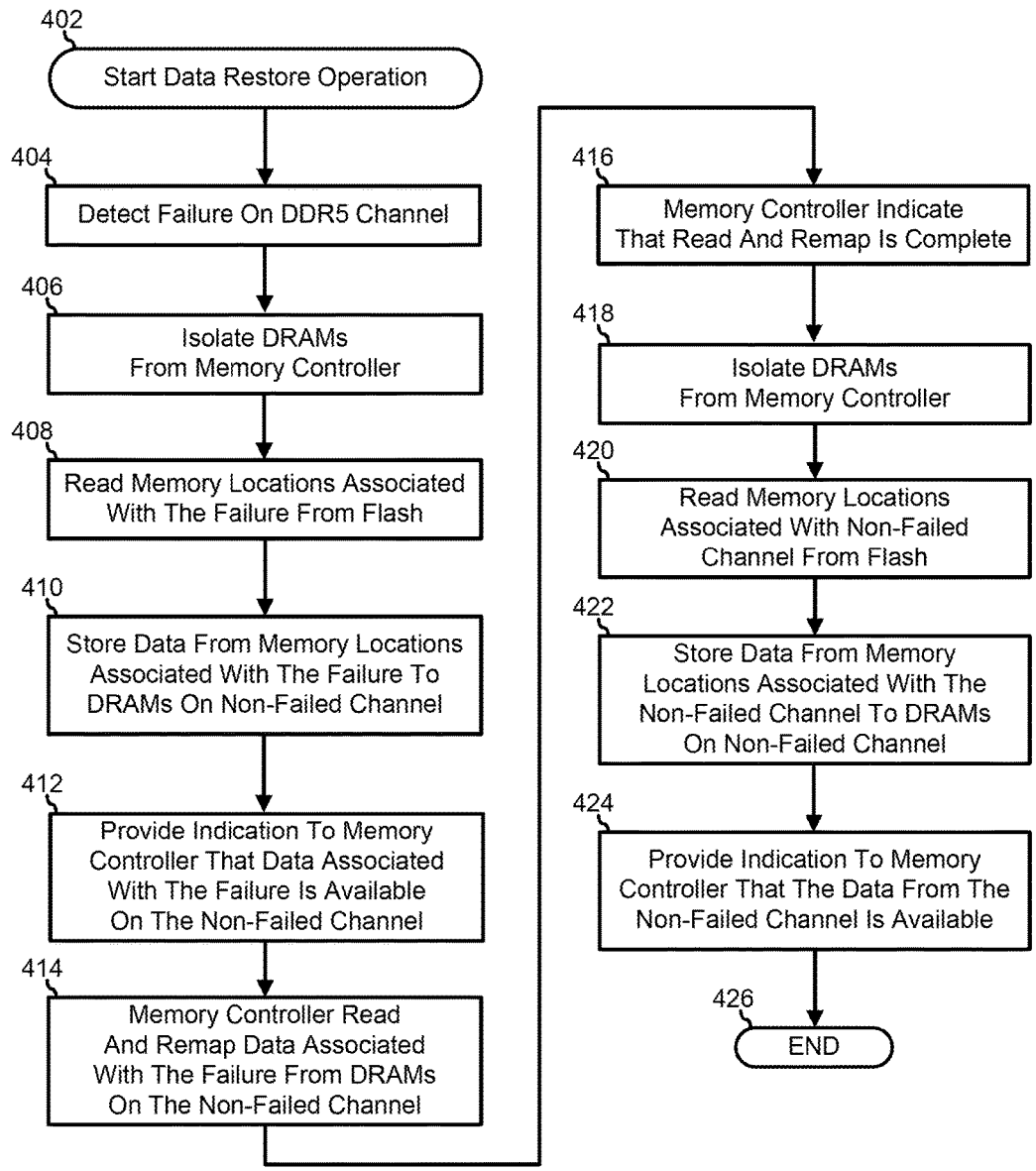
FIG. 4 is a flowchart illustrating a method for data restore flexibility on dual channel NVDIMMs according to an embodiment of the present disclosure.

FIG. 4 is a flowchart illustrating a method for data restore flexibility on dual channel NVDIMMS, starting at block 402, where a data restore operation is started. In a particular embodiment, the data restore operation is started as a part of a system power on sequence, such as a Power On Self Test (POST), a UEFI power on sequence, or the like. In another embodiment, the data restore operation is started in response to another agent of the information handling system, such as a system OS, an application, or the like. A DDR5 channel failure is detected in block 404. For example, a memory controller in an information handling system, or a NVDIMM controller in a DDR5 NVDIMM can detect that a particular DDR5 channel is unable to reliably transfer data between the memory controller and the DRAMs of the DDR5 NVDIMM. An NVDIMM controller of the DDR5 NVDIMM isolates the DRAMs of the DDR5 DIMM from the memory controller in block 406. The NVDIMM controller reads the data from the memory locations associated with the failed channel from a flash device of the DDR5 NVDIMM in block 408. The data from the memory locations associated with the failed channel is stored to the DRAM devices of the non-failed channel in block 412.

The NVDIMM controller provides an indication to the memory controller that the from the memory locations associated with the failed channel is available on the non-failed channel in block 412. For example, a NVDIMM controller can set a bit in a register that is polled by the memory controller, or the NVDIMM controller can send a back-channel control signal on the control and address bus of the non-failed channel, in order to provide the indication to the memory controller. The memory controller reads the data associated with the failed channel and remaps the data to new memory locations in block 414. The memory controller provides an indication to the NVDIMM controller that the data associated with the failed channel has been read and remapped in block 416. The NVDIMM controller again isolates the DRAMs of the DDR5 DIMM from the memory controller in block 418. The NVDIMM controller reads the data from the memory locations associated with the non-failed channel from the flash device in block 420. The data from the memory locations associated with the non-failed channel is stored to the DRAM devices of the non-failed channel in block 422. The NVDIMM controller provides an indication to the memory controller that the the memory locations associated with the non-failed channel is available on the non-failed channel in block 424, and the method ends in block 426.

Figure 5:
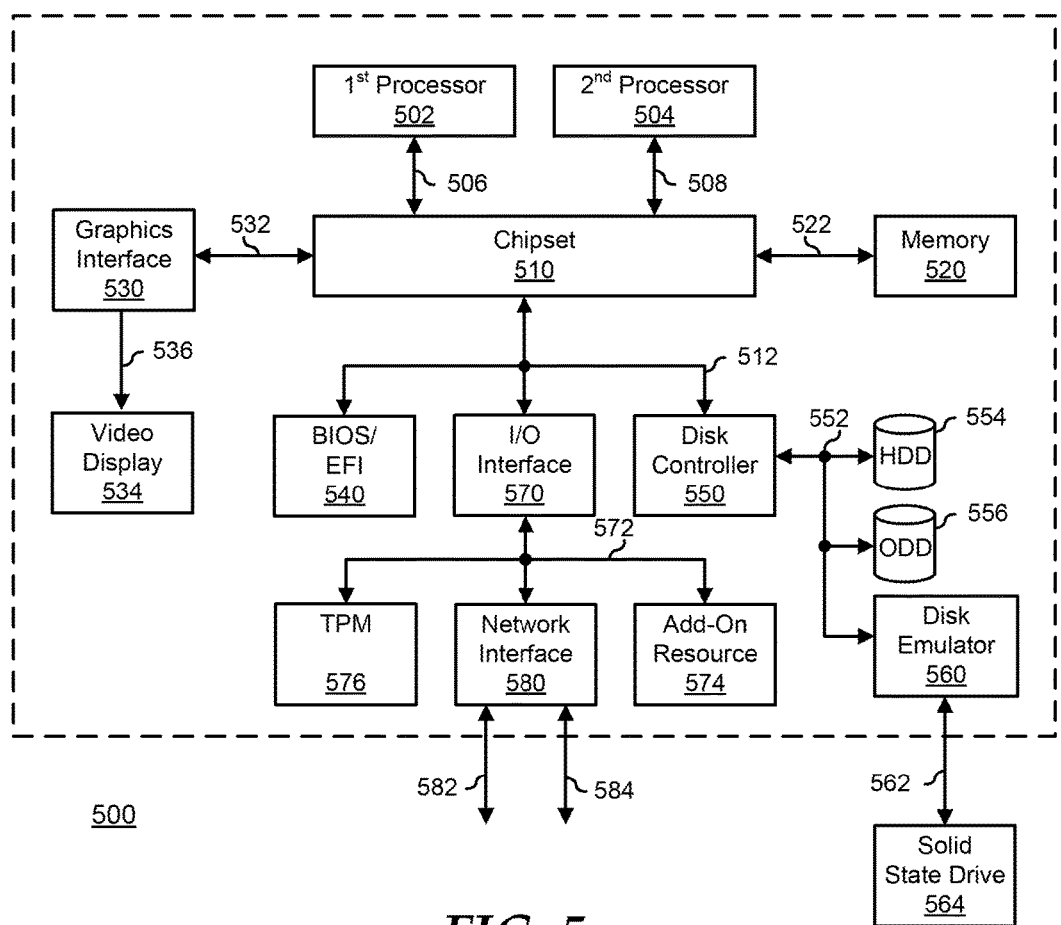
FIG. 5 is a block diagram illustrating a generalized information handling system according to an embodiment of the present disclosure.

FIG. 5 illustrates a generalized embodiment of information handling system 500. For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described above, and operates to perform one or more of the methods described above. Information handling system 500 includes a processors 502 and 504, a chipset 510, a memory 520, a graphics interface 530, include a basic input and output system/extensible firmware interface (BIOS/EFI) module 540, a disk controller 550, a disk emulator 560, an input/output (I/O) interface 570, and a network interface 580. Processor 502 is connected to chipset 510 via processor interface 506, and processor 504 is connected to the chipset via processor interface 508. Memory 520 is connected to chipset 510 via a memory bus 522. Graphics interface 530 is connected to chipset 510 via a graphics interface 532, and provides a video display output 536 to a video display 534. In a particular embodiment, information handling system 500 includes separate memories that are dedicated to each of processors 502 and 504 via separate memory interfaces. An example of memory 520 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 540, disk controller 550, and I/O interface 570 are connected to chipset 510 via an I/O channel 512. An example of I/O channel 512 includes a Peripheral Component Interconnect (PCI) interface, a PCI-Extended (PCI-X) interface, a high speed PCI-Express (PCIe) interface, another industry standard or proprietary communication interface, or a combination thereof. Chipset 510 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 540 includes BIOS/EFI code operable to detect resources within information handling system 500, to provide drivers for the resources, initialize the resources, and access the resources. BIOS/EFI module 540 includes code that operates to detect resources within information handling system 500, to provide drivers for the resources, to initialize the resources, and to access the resources.

Disk controller 550 includes a disk interface 552 that connects the disc controller to a hard disk drive (HDD) 554, to an optical disk drive (ODD) 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits a solid-state drive 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O interface 570 includes a peripheral interface 572 that connects the I/O interface to an add-on resource 574, to a TPM 576, and to network interface 580. Peripheral interface 572 can be the same type of interface as I/O channel 512, or can be a different type of interface. As such, I/O interface 570 extends the capacity of I/O channel 512 when peripheral interface 572 and the I/O channel are of the same type, and the I/O interface translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as chipset 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A Dual In-Line Memory Module (DIMM), comprising:
   a first Dynamic Random Access Memory (DRAM) device configured to perform memory transactions for first memory locations associated with the first DRAM device via a first memory channel;
   a second DRAM device configured to perform memory transactions for second memory locations associated with the second DRAM device via a second memory channel;
   a non-volatile memory device; and
   a DIMM controller configured to:
      store first data from the first memory locations and second data from the second memory locations to the non-volatile memory device in response to a save data operation from a memory controller;
      receive a first indication that communication via the first memory channel has failed;
      store the first data from the non-volatile memory device to the second DRAM device in response to the first indication and in response to a restore data operation from the memory controller;
      provide a second indication that the first data is stored on the second DRAM device;
      receive a third indication that the first data has been read by the memory controller;
      store the second data from the non-volatile memory device to the second DRAM device in response to the third indication; and
      provide a fourth indication that the second data is stored on the second DRAM device.

2. The DIMM of claim 1, wherein, in further response to the restore data operation, the DIMM controller is further configured to:
   isolate the first DRAM device and the second DRAM device from the memory controller.

3. The DIMM of claim 2, wherein after providing the second indication, the DIMM controller is further configured to:
couple the second DRAM device to the memory controller.

4. The DIMM of claim 3, further comprising:
a first multiplexor coupled to the first DRAM device and configured to selectably couple the first DRAM device to the memory controller and to the DIMM controller; and
a second multiplexor coupled to the second DRAM device and configured to selectably couple the second DRAM device to the memory controller and to the DIMM controller.

5. The DIMM of claim 4, wherein, in isolating the first DRAM device and the second DRAM device from the memory controller, the DIMM controller is further configured to:
select the first multiplexor to couple the first DRAM device to the DIMM controller; and
select the second multiplexor to couple the second DRAM device to the DIMM controller.

6. The DIMM of claim 5, wherein, in coupling the second DRAM device to the memory controller, the DIMM controller is further configured to:
select the second multiplexor to couple the second DRAM device to the memory controller.

7. The DIMM of claim 1, wherein the first DRAM device has a first storage capacity, the second DRAM device has a second storage capacity, and the non-volatile memory device has a third storage capacity, the third storage capacity being greater than a sum of the first storage capacity and the second storage capacity.

8. The DIMM of claim 7, wherein the DIMM comprises a N-type non-volatile DIMM (NVDIMM-N).

9. The DIMM of claim 1, wherein the DIMM comprises a fifth generation Double Data Rate (DDR5) DIMM.

10. A method, comprising:
providing, on a Dual In-Line Memory Module (DIMM), a first Dynamic Random Access Memory (DRAM) device configured to perform memory transactions for first memory locations associated with the first DRAM device via a first memory channel;
providing, on the DIMM, a second DRAM device configured to perform memory transactions for second memory locations associated with the second DRAM device via a second memory channel;
storing, on a non-volatile memory device of the DIMM, first data from the first memory locations and second data from the second memory locations to the non-volatile memory device in response to a save data operation from a memory controller;
receiving a first indication that communication via the first memory channel has failed;
storing the first data from the non-volatile memory device to the second DRAM device in response to the first indication and to a restore data operation from the memory controller;
providing a second indication that the first data is stored on the second DRAM device;
receiving a third indication that the first data has been read by the memory controller;
storing the second data from the non-volatile memory device to the second DRAM device in response to the third indication; and
providing a fourth indication that the second data is stored on the second DRAM device.

11. The method of claim 10, further comprising:
isolating the first DRAM device and the second DRAM device from the memory controller in further response to the restore data operation.

12. The method of claim 11, further comprising:
coupling the second DRAM device to the memory controller after providing the second indication.

13. The method of claim 12, further comprising:
coupling a first multiplexor to the first DRAM device, the first multiplexor being configured to selectably couple the first DRAM device to the memory controller and to the DIMM controller; and
coupling a second multiplexor to the second DRAM device, the second multiplexor being configured to selectably couple the second DRAM device to the memory controller and to the DIMM controller.

14. The method of claim 13, wherein, in isolating the first DRAM device and the second DRAM device from the memory controller, the method further comprises:
selecting the first multiplexor to couple the first DRAM device to the DIMM controller; and
selecting the second multiplexor to couple the second DRAM device to the DIMM controller.

15. The method of claim 14, wherein, in coupling the second DRAM device to the memory controller, the method further comprises:
selecting the second multiplexor to couple the second DRAM device to the memory controller.

16. The method of claim 10, wherein the first DRAM device has a first storage capacity, the second DRAM device has a second storage capacity, and the non-volatile memory device has a third storage capacity, the third storage capacity being greater than a sum of the first storage capacity and the second storage capacity.

17. The method of claim 16, wherein the DIMM comprises a N-type non-volatile DIMM (NVDIMM-N).

18. The method of claim 10, wherein the DIMM comprises a fifth generation Double Data Rate (DDR5) DIMM.

19. An information handling system, comprising:
a memory controller; and
a Dual In-Line Memory Module (DIMM), including a first Dynamic Random Access Memory (DRAM) device configured to perform memory transactions for first memory locations associated with the first DRAM device via a first memory channel, a second DRAM device configured to perform memory transactions for second memory locations associated with the second DRAM device via a second memory channel, a non-volatile memory device, and a DIMM controller configured to:
store first data from the first memory locations and second data from the second memory locations to the non-volatile memory device in response to a save data operation from the memory controller;
receive a first indication that communication via the first memory channel has failed;
store the first data from the non-volatile memory device to the second DRAM device in response to the first indication and to a restore data operation from the memory controller;
provide a second indication that the first data is stored on the second DRAM device;
receive a third indication that the first data has been read by the memory controller;
store the second data from the non-volatile memory device to the second DRAM device in response to the third indication; and provide a fourth indication that the second data is stored on the second DRAM device.

20. The information handling system of claim 19, wherein the DIMM further includes a first multiplexor coupled to the first DRAM device and configured to selectably couple the first DRAM device to the memory controller and to the DIMM controller, and a second multiplexor coupled to the second DRAM device and configured to selectably couple the second DRAM device to the memory controller and to the DIMM controller.

* * * * *